July 28, 1964 P. B. DAWSON 3,142,314
ENERGY CONVERTER
Filed May 4, 1962 2 Sheets-Sheet 1

INVENTOR.
PERCY B. DAWSON
BY
Lothrop & West
ATTORNEYS

United States Patent Office 3,142,314
Patented July 28, 1964

3,142,314
ENERGY CONVERTER
Percy B. Dawson, Orinda, Calif., assignor to Baldwin-Lima-Hamilton Corporation, a corporation of Pennsylvania
Filed May 4, 1962, Ser. No. 192,471
20 Claims. (Cl. 137—604)

My invention relates to means for use at the final outlet of a hydraulic discharge conduit for the purpose of preventing the issuance of a hydraulic jet with destructive force. In various locations, such as the discharge end of a liquid pipeline operating under pressure, it is often the case that the hydraulic fluid issues from the end of the conduit with great velocity and such force as to erode the surroundings or actually to be destructive to buildings or the like which might be in the jet path. Various types of mechanisms, usually referred to as "energy absorbers," have been utilized for preventing the destructive efflux of the water. Usually such energy "absorbers" are relatively expensive and require a good deal of space for installation.

The known types of devices are not always easily suited to the discharge characteristics of the pipeline. In some instances a pipeline must terminate in a special kind of valve for control purposes. The valve is of such a nature that it discharges the hydraulic fluid not in the form of a solid stream having a cylindrical envelope, but rather in a thin conical sheet; that is, in a widely diverging jet with a hollow conical interior. One of the types of valve which produces this characteristic hollow, thin-sheet, conical discharge is the so-called Howell-Bunger valve as disclosed in U.S. Patent No. 1,894,314.

It is therefore an object of this invention to provide an energy converter for use at the terminus of a hydraulic line for eliminating the destructive force of the hydraulic jet.

Another object of the invention is to provide an energy converter that is relatively inexpensive to manufacture, install and maintain.

A still further object of the invention is to provide an energy converter especially adapted for use with hollow jet discharges of the sort issuing from a Howell-Bunger valve.

Another object of the invention is to provide an energy converter that is relatively small in extent and so can easily be installed in most available surroundings.

A still further object of the invention is to provide an energy converter that is unusually effective for its purpose.

Other objects together with the foregoing are attained in the embodiment of the invention described in the accompanying description and illustrated in the accompanying drawings, in which.

Figure 1:
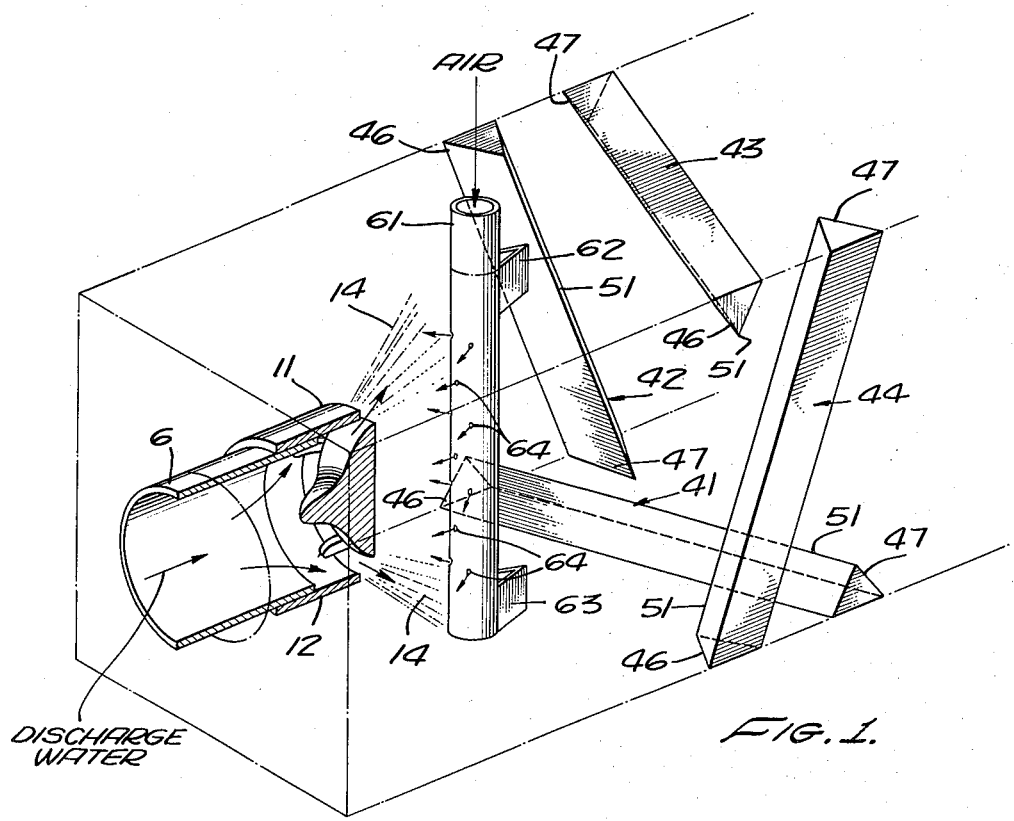
FIGURE 1 is an isometric diagram showing the principal components of the energy converter of the invention in their customary relationship.

In the customary commercial installation, the energy converter is used in connection with a hydraulic pipeline 6. This is a circular-cylindrical conduit disposed with its central axis 7 in a generally horizontal attitude. The conduit 6 extends through a concrete wall 8 forming part of a concrete building 9. The conduit 6 terminates in a discharge valve 11 of the Howell-Bunger or other comparable type. This valve includes an exterior terminal collar 12 movable to and fro along the axis 7 by means of actuating rods 13 and appropriate attendant mechanism forming no part of the present invention and so not shown. The effect of the valve 11 is to discharge the hydraulic fluid from the conduit 6 in a patterned jet 14 having an exterior conical envelope 15 of considerable divergence and also having an internal conical envelope 16 of the same or somewhat lesser divergence, thus leaving a relatively thin annular sheet of water issuing with relatively high velocity.

In accordance with my invention, I preferably provide symmetrically on the axis 7 and around the conduit 6 a housing 21 disposed in the concrete structure 9 and almost entirely encased thereby. The housing includes metal lining plates, such as 22, extending from a metal rear wall panel 23 to a line of juncture 24 downstream of the nozzle. The compartment or partial enclosure 26 bounded by the wall plates 22 and the panel 23 affords an antechamber for access and servicing. Entry to the compartment 26 is gained through a removable cover 27 which normally is in place, as shown. The wall plates 22 and the panel 23 are welded to supports and reinforcements 28 embedded in concrete so that they are permanently and firmly fixed in the concrete building 9.

Figure 3:
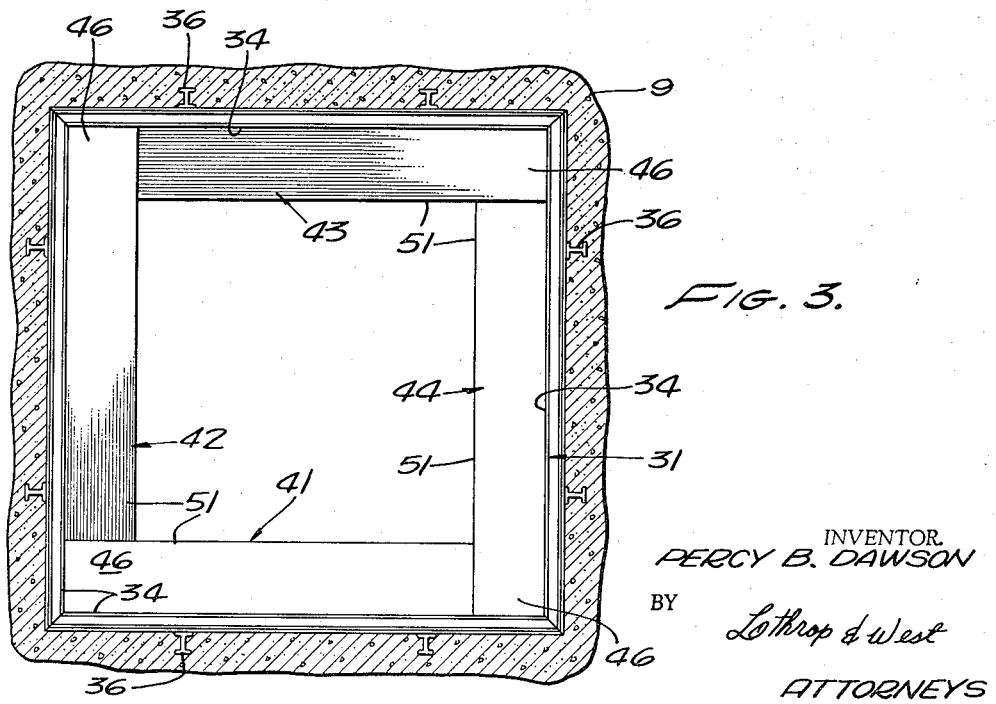
FIGURE 3 is a cross section, the plane of which is indicated by the line 3—3 of FIGURE 2.
Figure 2:
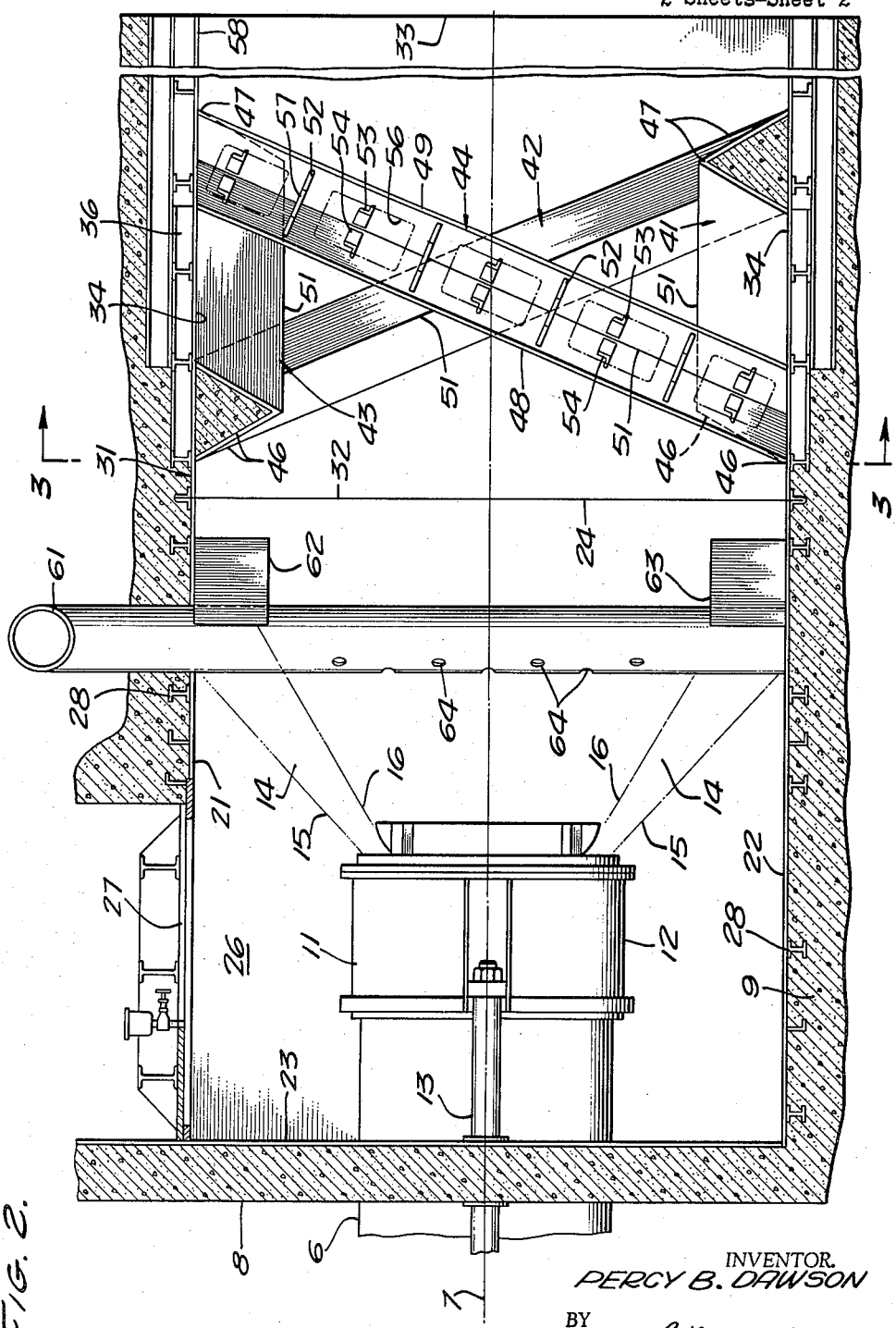
FIGURE 2 is a cross section on a longitudinal vertical plane through an energy converter as it is commercially constructed.

Particularly in accordance with the invention, I provide in alignment on the axis 7 and downstream of the jet 14 a special housing 31. This housing continues the compartment 26 and is generally similar thereto. The housing 31 is open at both its upstream end 32 (abutting the juncture 24) and at its downstream terminus 33. The hollow housing 31 defines a through passageway for the hydraulic fluid. Contrary to usual conduit construction, the housing 31 is not circular in transverse cross section or in cross section in a plane normal to the axis 7, but rather is polygonal in cross section, the preferred polygonal form being that of a rectangle and particularly that of a square, as indicated in FIGURE 3. The housing 31 is particularly defined by a number of side walls 34, usually four in number, and made up of metal plates arranged to abut each other at their margins. The plates are secured to appropriate reinforcing backing 36 so as to be anchored or imbedded in the concrete building 9 in a permanent fashion. The housing 31, although shown broken away in FIGURE 2, has its downstream end 33 a distance away from the upstream end 32 which is a multiple of the transverse dimension of the housing, for example, twice the transverse dimension.

As so far described, the housing affords a smooth-walled, elongated, hydraulic passageway several times as long as it is wide or high and effective to receive the circular cross section jet 14 in a rectangular cross section chamber.

Located within the housing 31 adjacent the upstream end 32 thereof and in an upstream zone occupying about a third of the length of the housing are baffles 41, 42, 43 and 44, respectively, one each for the four side walls of the housing. The baffles are all substantially identical so that a detailed description of one applies equally to the others. The baffles are arranged with their upstream ends 46 all conveniently but not necessarily disposed in substantially the same upstream transverse plane normal to the axis 7 and also terminate with their downstream ends 47 preferably but not necessarily disposed in a common transverse downstream plane normal to the axis 7. Each of the baffles at its central point is tangent to a particular helix wound about the axis 7, all of the helices for the various baffles being of the same curl or "hand." It can also be considered that the baffles are skewed within the hydraulic conduit.

Each of the baffles, such as the baffle 44, is preferably comprised of a straight length of angle iron arranged with its base against the side wall of the housing and disposed with its side edges 48 and 49 welded to the subjacent housing plate. The angle iron is thus cantilevered or disposed with its ridge 51 or apex projecting part way into the hydraulic passageway. Each baffle is reinforced at intervals with cross plates 52 and also has welded to it some inwardly projecting angles 53 and 54. Along each of the baffles the adjoining side walls of the housing are provided with cut-out openings 56. When the concrete for the building 9 is poured around the housing plates, some of it will travel inwardly through the holes 56 and will interlock around the angles 53 and 54. Some will also pass through openings 57 cut in the cross plates 52 so that throughout its entire length the baffle is well anchored to the actual concrete building in addition to being welded to the metal side walls of the housing.

It has been determined experimentally that it is preferably and only necessary to provide baffles near the upstream end of the housing and terminating at a substantial distance from the downstream edge 33 thereof to leave a substantial expanse 58 of the downstream interior of the housing devoid of baffles and in a plane or smooth condition.

In addition to the baffles, the housing is provided between the jet 14 and the baffles with a transversely extending air tube 61 supplied with air from any suitable source such as the atmosphere. The tube ends on the bottom plate 22 of the enclosure. The air tube is partially supported and reinforced by streamlined farings 62 and 63. It is not necessary to have the streamline farings extend entirely across the tube 61 since the hollow nature of the jet 14 leaves no water to strike against the central part of the tube 61.

A plurality of openings 64 are made in the tube affording communication between the tube interior and the interior of the compartment or housing. The openings 64 are not on the downstream side of the tube 61 as might be expected, but rather are on the upstream side thereof since a negative pressure develops in that region. The tube 61 is thus effective to discharge air into the hollow interior of the jet 14. In practice it is observed that there is a zone or region of relatively low pressure within the interior of the hollow jet 14 which is much more pronounced on the upstream side of the tube 61 so that air is induced through the openings 64 and is entrained by and comingles with the issuing water.

In the operation of this structure, the water discharging in a high velocity jet and in a hollow, conical or fanlike configuration having a thin annular cross section impinges upon and flows past the pipe 61. Some of the jet converges on the downstream side of the streamlined farings 62 and 63. During this time some air is entrained with the water. Upon striking the baffles and the square walls of the housing, the water tends to swirl in one direction, but the swirl cannot be augmented and maintained because the conduit or housing is not circular. As the water strikes the various plates in succession and is directed toward other parts of the flowing fluid it creates innumerable eddies and back currents and a high degree of aerated turbulence. The directional energy of the water is broken up and the velocity energy converted into the form of heat, slightly raising the temperature of the water itself.

Once substantial turbulence and entrainment of air have been initiated in passing the baffles, the water continues in a roiled condition until its remaining velocity energy is finally converted in the plane, square cross section downstream portion of the tube or housing. In a comparatively short distance the water becomes sluggish and issues from the bottom of the downstream discharge end 33 as a slow flowing, full stream still with innumerable minor and small eddies but with only a benign, consistent velocity in the direction of the axis 7.

Actual trials of a device constructed pursuant to the disclosure herein indicate that the initial velocity of the water or its spouting energy are converted almost entirely into heat so that the water emerging from the housing is an innocuous stream.

Under some conditions of operation, the outfall from the energy converter housing is sufficient so that except for the water travelling on the bottom thereof the end of the housing is virtually empty. Under other conditions wherein there is not a good outfall, the water may stand within the housing up to a considerable elevation. Under both extreme circumstances and under any intermediate condition the energy converter nevertheless acts substantially as described. Even though the jet issuing from the conduit 6 has a high velocity, that water when it issues from the downstream end of the converter has substantially no velocity in the direction of the axis 7.

What is claimed is:

1. An energy converter for use with a hydraulic jet issuing along an axis comprising a housing adapted to be disposed downstream of a hydraulic jet and to extend coaxially therewith, means forming interior walls of said housing and defining a hydraulic passage rectangular in cross section in a plane normal to said axis, and means on each one of said interior walls and extending into said passage to form baffles, each of said means being triangular in cross section in a plane containing said axis and having one end disposed upstream near an adjacent one of said walls and the other end disposed downstream near a different adjacent one of said walls in said passage.

2. An energy converter for use with a hydraulic jet issuing along an axis comprising a housing adapted to be disposed downstream of a hydraulic jet and to extend coaxially therewith, means forming interior walls of said housing and defining a hydraulic passage rectangular in cross section in a plane normal to said axis, and inclined baffles on and disposed across each of said interior walls extending into said passage, said baffles at one end being disposed upstream of said passage and at the other end being disposed downstream of said passage.

3. An energy converter for use with a hydraulic jet issuing along an axis comprising means defining a hydraulic passage adapted to be disposed downstream of and coaxially with respect to a hydraulic jet, said passage being rectangular in cross section in a plane normal to said axis, and baffles on the walls of said passage and extending into said passage, each of said baffles being a rectilinear member and at its midportion being tangent to a helix generated about said axis, the helices for all of said baffles being of the same hand.

4. An energy converter as in claim 3 in which the upstream end of one baffle is axially spaced from the downstream end of the adjacent baffle.

5. An energy converter for use with a hydraulic jet issuing along an axis comprising four walls defining a hydraulic passage adapted to be disposed downstream of and coaxially with respect to a hydraulic jet, said passage being square in cross section in a plane normal to said axis, substantially identical baffles on each of said walls extending into said passage, each of said baffles being inclined to said axis and being triangular in cross section in the plane of said axis, and all of said baffles having the upstream ends thereof disposed in the same upstream plane normal to said axis and have the downstream ends thereof disposed in the same downstream plane normal to said axis.

6. An energy converter for use with a hydraulic jet issuing along an axis comprising a housing adapted to be disposed downstream of a hydraulic jet and to extend coaxially therewith, said housing defining a hydraulic passage rectangular in cross section normal to said axis, and baffles in the upstream portion only of said housing leaving the downstream portion of said housing free of baffles, each of said baffles being inclined to said axis and being a rectilinear member projecting into said passage from the wall of said housing and all of said baffles having the upstream ends thereof disposed in the same upstream plane normal to said axis and having the downstream ends thereof disposed in the same downstream plane normal to said axis.

7. An energy converter for use with a hydraulic jet issuing along an axis comprising a housing adapted to be disposed downstream of a hydraulic jet and defining a hydraulic passage, said housing being noncircular in cross section in a plane normal to said axis, and baffles inclined to said axis and projecting from said housing into said passage, all of said baffles having the upstream ends thereof disposed in an upstream plane and having the downstream ends thereof disposed in a downstream plane spaced from the outlet of said passage.

8. An energy converter comprising an elongated housing open at the upstream end and at the downstream end and defining a hydraulic passage rectangular in transverse cross section, baffles cantilevered from all of the walls of said housing into said passage but only in a zone near said upstream end, all of said baffles being similarly inclined from their ends near said upstream end to their ends remote from said upstream end.

9. An energy converter as in claim 8 in which said baffles are triangular in cross section with their bases against said housing.

10. An energy converter comprising an elongated housing open at the upstream end and at the downstream end and defining a hydraulic passage polygonal in transverse cross section; and a separate baffle on each of the walls of said housing and projecting into said passage; all of said baffles having their upstream ends disposed near said upstream end, being similarly inclined and having their downstream ends disposed away from said downstream end to leave a downstream portion of said passage free of baffles.

11. An energy converter as in claim 10 in which each of said baffles is a rectilinear member triangular in cross section.

12. An energy converter for use with a hydraulic jet issuing along an axis comprising a housing adapted to be disposed downstream of a hydraulic jet and to extend coaxially therewith, said housing defining a hydraulic passage, baffles on said housing downstream of said jet and extending into said passage, an air tube extending transversely of said passage between said jet and said baffles, and means forming air openings from said tube into said passageway on the upstream side only of said air tube.

13. An energy converter for use downstream of a hydraulic jet comprising an open ended, hollow housing square in transverse cross section and having therein baffles themselves triangular in cross section and disposed in similar skew positions on the walls of and within said hollow housing.

14. An energy converter as in claim 13 in which said baffles are disposed adjacent the upstream end only of said housing.

15. An energy converter as in claim 13 in which an air tube extends transversely of the upstream end of said housing with air openings from said tube into said hollow housing on the upstream side only of said tube.

16. An energy converter for use with a hydraulic jet of hollow conical form issuing along an axis in a predetermined direction comprising a housing adapted to extend in a predetermined direction and to extend symmetrically about said axis, means forming interior walls of said housing and defining a hydraulic passage rectangular in cross section in a plane normal to said axis, and means on each of said interior walls and extending into said passage to form baffles, each of said means being similarly slanted along its respective wall with respect to said direction.

17. An energy absorber as in claim 16 in which the corresponding ends of all of said baffles are disposed substantially in one plane normal to said axis and the other ends of all of said baffles are disposed substantially in another plane normal to said axis.

18. An energy absorber as in claim 16 in which said axis is substantially horizontal.

19. An energy converter comprising an elongated horizontal housing open at both ends, said housing including longitudinally extending walls defining a passage polygonal in transverse cross section, baffles extending from said walls into said passage, each of said baffles being an elongated member extending longitudinally at a predetermined skew and all of said baffles originating substantially in one transverse plane and terminating in a different transverse plane.

20. An energy converter as in claim 19 with the addition of an air inlet tube extending across said housing between the end thereof and said one plane, said pipe having openings therein on the side thereof toward said end and away from said one plane.

References Cited in the file of this patent
UNITED STATES PATENTS

| | | |
|---|---|---|
| 1,006,016 | Spayd | Oct. 17, 1911 |
| 1,090,100 | Englesson | Mar. 10, 1914 |
| 1,474,115 | Heather | Nov. 13, 1923 |
| 1,539,256 | Gfeller | May 26, 1925 |
| 2,174,598 | Quick | Oct. 3, 1939 |
| 2,308,136 | White | Jan. 12, 1943 |
| 2,371,202 | Whitesel | Mar. 13, 1945 |